Figure 1:
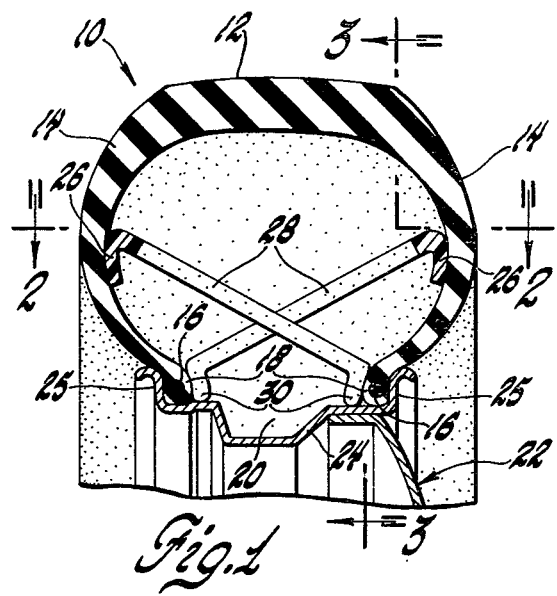

United States Patent [19]

Cataldo

[11] 4,137,960
[45] Feb. 6, 1979

[54] RUN-FLAT TIRE HAVING INTERNAL SUPPORT MEANS

[75] Inventor: Roy S. Cataldo, Birmingham, Mich.

[73] Assignee: General Motors Corporation, Detroit, Mich.

[21] Appl. No.: 848,948

[22] Filed: Nov. 7, 1977

[51] Int. Cl.² .......................... B60C 5/00; B60C 17/00
[52] U.S. Cl. .............................. 152/158; 152/330 RF; 152/155
[58] Field of Search ................. 152/158, 330 RF, 155, 152/330 L, 330 R, 353 R, 399, 400, 352

[56] References Cited
U.S. PATENT DOCUMENTS

| | | | |
|---|---|---|---|
| 792,897 | 6/1905 | Hill | 152/379.1 |
| 2,951,523 | 9/1960 | Madden et al. | 152/400 |
| 3,982,576 | 9/1976 | Replin | 152/155 |

*Primary Examiner*—Francis S. Husar
*Assistant Examiner*—Lawrence E. Williams
*Attorney, Agent, or Firm*—John P. Moran

[57] ABSTRACT

The drawings disclose a pneumatic tubeless tire including oppositely disposed annular support members attached to the inner surfaces of the usual two sidewalls at substantially the widest portion thereof, and a plurality of ribs formed of a suitable thermoplastic material containing glass fiber reinforcement, and each having one end thereof integrally formed with one annular support member and extending across the tire in an alternately spaced relationship from the annular support member either to the inner surface of the oppositely disposed beaded end or to the other annular support member, the annular support members and the plurality of bridging ribs providing lateral and radial support for the tire sidewalls, particularly when the tire becomes deflated.

4 Claims, 9 Drawing Figures

RUN-FLAT TIRE HAVING INTERNAL SUPPORT MEANS

This invention relates generally to pneumatic tires and, more particularly, to pneumatic tires having internal "run-flat" features.

Heretofore, various structures have been suggested for use inside a pneumatic tire to support the weight of the vehicle in the event of a deflated tire.

The object of this invention is to provide improved internal means for use in pneumatic tires for rotatably supporting a vehicle in the event of a "flat tire" condition.

Another object of the invention is to provide an improved pneumatic tire wherein lateral and radial support means are formed as an integral part of the tire.

A further object of the invention is to provide a pneumatic tubeless tire including the usual outer tread surface, oppositely disposed sidewalls, and bead adjacent each inner side wall end, and, in cooperation therewith, internal support means including oppositely disposed annular support members attached to the inner surfaces of the two sidewalls at substantially the widest portion thereof, and a plurality of spaced ribs formed of a suitable thermoplastic material containing glass fiber reinforcement, and each having one end thereof integrally formed with one annular support member and extending across the tire from the annular support member either to the other annular support member or to the inner surface of the oppositely disposed beaded end and being attached thereto by any suitable means, such as bonding, the annular support members and the plurality of ribs serving as lateral and radial support means for the tire sidewalls, particularly when the tire becomes deflated.

Figure 2:
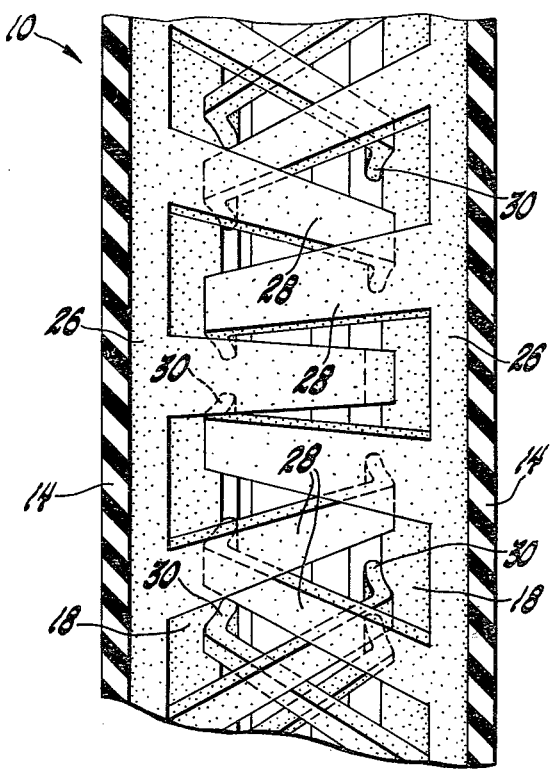
Figure 3:
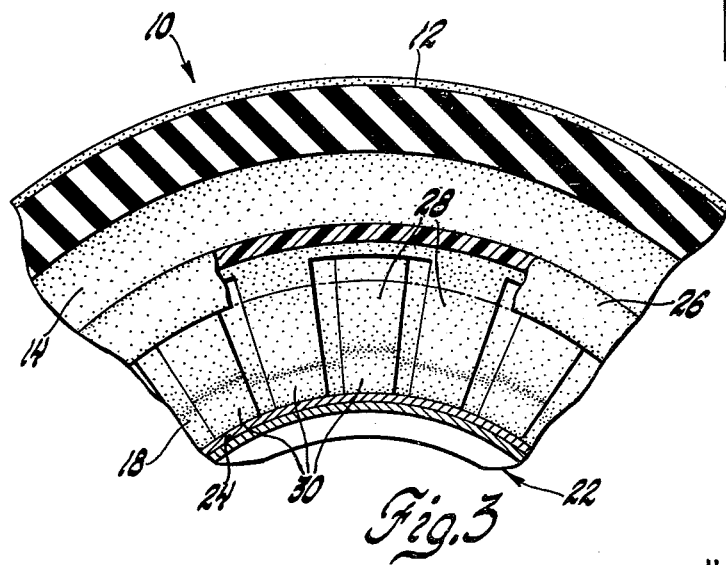
Figure 4:
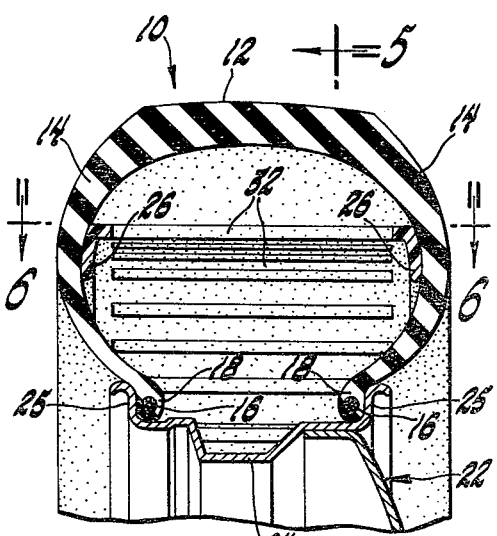
Figure 5:
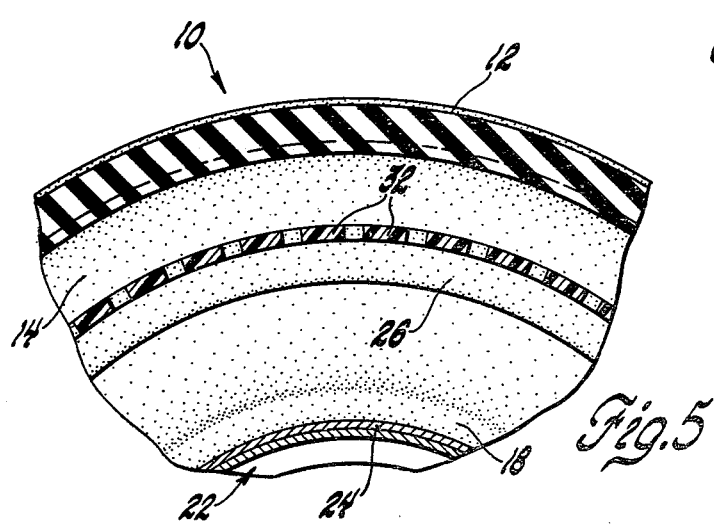
Figure 6:
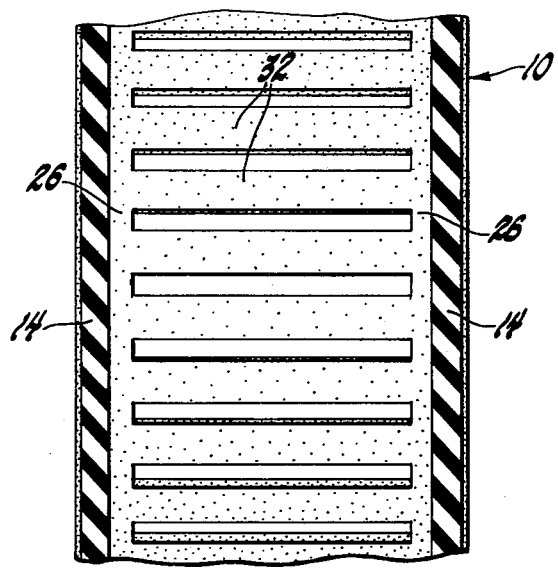
Figure 7:
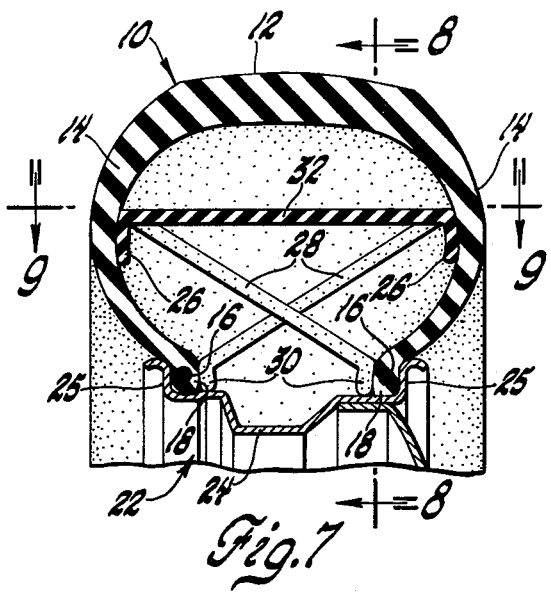
Figure 8:
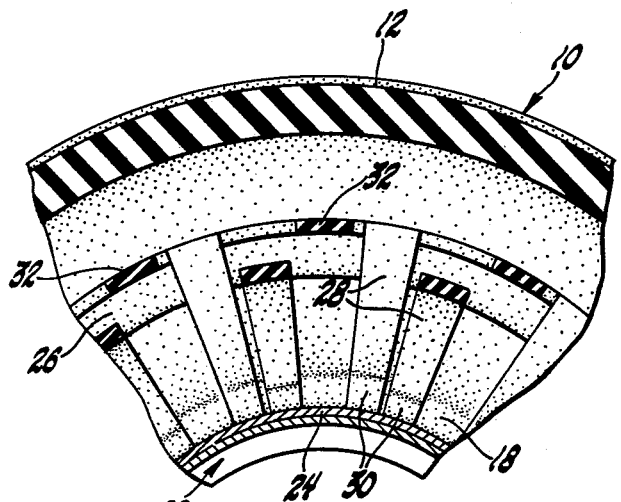
Figure 9:
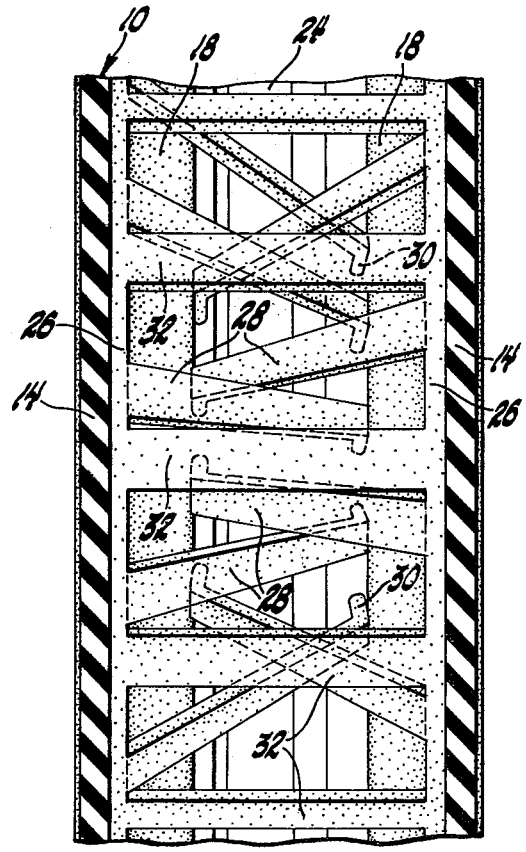

These and other objects and advantages will become more apparent when reference is made to the following description and accompanying drawings, wherein:

FIG. 1 is a fragmentary cross-sectional view of a wheel and pneumatic tire arrangement embodying the invention;

FIGS. 2 and 3 are fragmentary cross-sectional views taken along the planes 2—2 and 3—3, respectively, of FIG. 1, and looking in the directions of the arrows;

FIG. 4 is a fragmentary cross-sectional view of a wheel and pneumatic tire arrangement showing an alternate embodiment of the invention;

FIGS. 5 and 6 are fragmentary cross-sectional views taken along the planes 5—5 and 6—6, respectively, of FIG. 4, and looking in the directions of the arrows;

FIG. 7 is a fragmentary cross-sectional view of a wheel and pneumatic tire arrangement showing another alternate embodiment of the invention; and FIGS. 8 and 9 are fragmentary cross-sectional views taken along the planes 8—8 and 9—9, respectively, of FIG. 7, and looking in the directions of the arrows.

Referring now to the drawings in greater detail, FIGS. 1-3 illustrate a pneumatic tubeless tire 10 including a carcass having an outer tread surface 12, oppositely disposed sidewalls 14, a bead 16 adjacent each inner sidewall end portion 18, and an annular opening 20 between the beaded ends, for mounting on a vehicle wheel 22 having a rim 24 including rim flanges 25 formed on oppositely disposed sides thereof for retaining the beaded ends 16, 18 in sealing engagement therewith when the tire is inflated.

An annular support ring 26 is attached by any suitable means, such as bonding or molding, to the inner surface of each of the sidewalls 14 at substantially the widest portion thereof. A plurality of spaced ribs 28 are integrally formed on each of the annular support members 26, the spacing being such that the two sets of ribs alternately crisscross each other in an "X" configuration as they traverse the tire from the respective annular support members toward the other sidewall 14. A radially inwardly directed lip or flange 30 is formed on the distal end of each rib 28 and secured by bonding or other suitable means to the inner surface of the respective beaded end 18 of the sidewall, as shown in FIG. 1.

The annular support members 26 and their respective sets of ribs 28 and flanges 30 are formed of any suitable material, such as a thermoplastic or thermoset material containing fibrous-glass reinforcement, having strength enough to provide lateral and radial support to a tire when it becomes deflated.

As an alternate embodiment to the arrangement of FIGS. 1-3, reference will now be made to the structure illustrated in FIGS. 4-6 wherein elements the same as those in FIG. 1 bear the same reference numerals. As shown in FIGS. 4 and 6, the oppositely disposed annular support members 26 are formed, such as by bonding or molding, on the inner surface of each sidewall 14 at substantially the widest portion thereof, as was the case in the FIG. 1 structure. A plurality of horizontally oriented, spaced ribs 32 are integrally formed at opposite ends thereof on the oppositely disposed annular support members 26, such that the ribs span the width of the tire in a spaced relationship, as shown in FIG. 6, to provide lateral support to the tires 10 to prevent collapse of the sidewalls 14 thereof, particularly when the tire becomes deflated.

Referring now to FIGS. 7-9, it may be noted that the two previously described support arrangements are incorporated in one system wherein the horizontally oriented ribs 32 and the two sets of crisscrossing ribs 28 are formed in a repeating serial relationship around the tire 10, i.e., each series consists of one horizontal rib 28 and two crossed ribs 28, providing the advantages of both of the above-described arrangements.

It should be apparent that the invention provides an efficient means for supporting the vehicle in a continuing forward motion should the tire become deflated.

While but three embodiments of the invention have been shown and described, other modifications thereof are possible.

The embodiments of the invention in which an exclusive property or privilege is claimed are defined as follows:

1. In a pneumatic tubeless tire including a carcass having an outer tread surface, oppositely disposed sidewalls, a bead adjacent each inner sidewall end, and an annular opening between the beaded ends, for mounting on a vehicle wheel having rim flanges formed on oppositely disposed sides thereof for retaining the beaded ends in sealing engagement therewith when the tire is inflated, the improvement comprising at least one annular support member attached to the inner surface of one of the sidewalls at substantially the widest portion thereof, and a plurality of spaced ribs, each having one end thereof integrally formed with the annular support member and extending across the tire from the annular support member to a predetermined location on the inner surface of the other sidewall and being attached thereto, the annular support member and the plurality of ribs providing lateral and radial support to the tire, particularly when the tire becomes deflated.

2. In a pneumatic tubeless tire including a carcass having an outer tread surface, oppositely disposed sidewalls, and a bead confined in each sidewall adjacent the radially inner end thereof forming beaded ends for mounting on a vehicle wheel having rim flanges formed on oppositely disposed sides thereof for retaining the beaded ends in sealing engagement therewith when the tire is inflated, the improvement comprising an annular support member attached to the inner surface of each of the sidewalls at substantially the widest portion thereof, two sets of spaced ribs, each rib of each set having one end thereof integrally formed on one of the annular support members in an alternately crisscrossing relationship around the circumference of the tire, and a radially inwardly directed flange formed on the distal end of each rib and secured to the inner surface of the adjacent end of the tire sidewall, the annular support members and the two sets of alternately spaced ribs providing lateral and radial support to the tire sidewalls, particularly when the tire becomes deflated.

3. In a pneumatic tubeless tire including a carcass having an outer tread surface, oppositely disposed sidewalls, and a bead confined in each sidewall adjacent the radially inner end thereof forming beaded ends for mounting on a vehicle wheel having rim flanges formed on oppositely disposed sides thereof for retaining the beaded ends in sealing engagement therewith when the tire is inflated, the improvement comprising an annular support member attached to the inner surface of each of the sidewalls at substantially the widest portion thereof, and a plurality of horizontally oriented ribs formed in a spaced relationship around the circumference of the tire, each rib having the oppositely disposed ends thereof integrally formed on the respective annular support members so as to extend across the tire at the widest portion thereof to provide lateral and radial support to the tire sidewalls, particularly when the tire becomes deflated.

4. In a pneumatic tubeless tire including a carcass having an outer tread surface, oppositely disposed sidewalls, and a bead confined in each sidewall adjacent the radially inner end thereof forming beaded ends for mounting on a vehicle wheel having rim flanges formed on oppositely disposed sides thereof for retaining the beaded ends in sealing engagement therewith when the tire is inflated, the improvement comprising an annular support member attached to the inner surface of each of the sidewalls at substantially the widest portion thereof, and three sets of spaced ribs alternately positioned around the circumference of the tire, and each rib of one set having one end thereof integrally formed on one annular support member and extending horizontally across the tire from the one annular support member to the other annular support member, and the ribs of the other two sets having alternate ends thereof integrally formed on opposite annular support members and the other ends thereof extending in a crisscrossing relationship toward the oppositely disposed beaded ends of the opposite sidewall, and a radially inwardly directed flange formed on the other end of each rib and secured to the inner surface of the adjacent beaded end, the three sets of alternately spaced ribs providing lateral and radial support to the tire sidewalls, particularly when the tire becomes deflated.

* * * * *